United States Patent
Reeve et al.

(10) Patent No.: US 7,333,906 B2
(45) Date of Patent: Feb. 19, 2008

(54) QUALITY ANALYSIS INCLUDING CUMULATIVE DEVIATION DETERMINATION

(75) Inventors: Michael Reeve, London (CA); Jean-Paule Mongeau Grice, St. Thomas (CA)

(73) Assignee: OES, Inc., London, Ontario (CA)

( * ) Notice: Subject to any disclaimer, the term of this patent is extended or adjusted under 35 U.S.C. 154(b) by 0 days.

(21) Appl. No.: 11/200,405

(22) Filed: Aug. 9, 2005

(65) Prior Publication Data
US 2006/0047453 A1   Mar. 2, 2006

Related U.S. Application Data

(60) Provisional application No. 60/600,582, filed on Aug. 11, 2004.

(51) Int. Cl.
*G01N 37/00* (2006.01)
(52) U.S. Cl. .......................... 702/81; 700/109
(58) Field of Classification Search .................. 702/81, 702/82, 84, 104, 182, 188, 189; 700/28, 700/29, 30, 108–110, 112
See application file for complete search history.

(56) References Cited

U.S. PATENT DOCUMENTS

| | | | |
|---|---|---|---|
| 5,406,044 A * | 4/1995 | Killian et al. | 219/99 |
| 6,853,920 B2 * | 2/2005 | Hsiung et al. | 702/1 |
| 6,970,857 B2 * | 11/2005 | Card et al. | 706/19 |
| 2003/0051873 A1 * | 3/2003 | Patzek et al. | 166/252.1 |

* cited by examiner

*Primary Examiner*—Bryan Bui
(74) *Attorney, Agent, or Firm*—Carlson, Gaskey & Olds

(57) ABSTRACT

A device and technique for monitoring the quality of a manufacturing process, a resulting part or both includes determining a cumulative deviation of an actual process signature from an expected signature. A disclosed example includes determining a quantitative value of a difference between the signatures at each of a plurality of corresponding segments of the signatures. A cumulative deviation based upon deviations of the corresponding segments provides an indication of quality. A disclosed example includes determining a negative cumulative deviation, a positive cumulative deviation and a total cumulative deviation, each of which may be used independently for analysis purposes.

27 Claims, 2 Drawing Sheets

QUALITY ANALYSIS INCLUDING CUMULATIVE DEVIATION DETERMINATION

CROSS REFERENCE TO RELATED APPLICATIONS

This application claims priority to U.S. Provisional Application No. 60/600,582, which was filed on Aug. 11, 2004.

FIELD OF THE INVENTION

This invention generally relates to manufacturing processes. More particularly, this invention relates to monitoring quality associated with a manufacturing process.

DESCRIPTION OF THE RELATED ART

Various industries require quality monitoring to determine the quality of manufacturing processes, the quality of resulting products or both. Conventional techniques are useful but are not capable of providing adequate results for some quality determination requirements.

Signature analysis is one known quality assurance technique used for ensuring that a process is consistently and repeatedly performed. Signature analysis provides an indication, for example, when there is a deviation between an actual process and the expected or desired process. With known signature analysis techniques, the process is represented by a curve illustrating a relationship between a characteristic of the monitored process and time or position, for example. The signature or curve is unique to the manufacturing process. A reliable and consistent process results in a signature that is uniform and stable cycle after cycle.

Signature analysis techniques rely upon the premise that a process can be reliably compared to a reference signature for that particular process. Any changes in the process occurring during actual implementation results in variations between the process signature and the reference signature, which can be identified.

There are several signature analysis techniques in use today. One, which is known as the peak method, involves analyzing whether the peak characteristic of the process is within an acceptable range of the peak of the reference signature. As long as the peak value of the actual process is within a selected range of the reference peak, the process is considered acceptable.

A significant shortcoming of the peak method is that it is not capable of detecting fine errors in the process. It is also not capable of detecting errors occurring during a portion of the process not corresponding to the peak. Moreover, the peak technique is not useful for processes where the peak is an intentional characteristic of the process such as a force supplied to tooling even after movement of the tooling has ceased. Another example is a process where the peak is a controlled aspect of the machinery. Because the peak in such cases is an integral component of the process, it is not a good indicator of the overall process consistency or the quality of a resulting part.

Another method, which is known as the area method, includes considering the entire period during which a process characteristic is analyzed. With the area method, the area beneath the curve of the reference signature is compared to the area beneath the curve of the actual process signature. If there is a difference between the two areas, that is compared to an acceptable range of difference to determine whether the process or resulting part is acceptable.

While the area method is more effective at detecting fine areas than the peak method, the area method if not without shortcomings. For example, where the actual process signature varies above and below the reference signature during the process, those variations may offset each other so that the area under the reference signature and the area under the actual process signature are essentially equal even though the two signatures are significantly different. This presents the possibility of accepting a part that does not meet a quality standard.

Another known method is sometimes referred to as the envelope method. This method includes establishing an envelope that generally follows the reference signature. As long as the actual process signature is within the envelope, the process or part is considered acceptable. If any portion of the actual process signature falls outside of the envelope, the process is considered unacceptable and the part quality may be considered uncertain or inadequate.

One shortcoming of the envelope method is that for detecting minor variations, the envelope has to be established very close to the reference signature. If the tolerance is set too tightly, that introduces the potential for considering many acceptable parts to be defective. On the other hand, if the envelope tolerance is set too loosely, there is the possibility for accepting parts that are defective.

There is a need for an improved quality determination technique that does not suffer from the drawbacks of the various methods described above. This invention provides such a technique.

SUMMARY OF THE INVENTION

An exemplary disclosed method of monitoring a quality includes determining a cumulative deviation of a plurality of segments of an actual process signature from corresponding segments of an expected signature as an indicator of quality.

One example includes determining a quantitative value of the cumulative deviation. Determining a quantitative value of a deviation of the actual process signature from the expected signature at each of the corresponding segments allows for determining the quantitative value of the cumulative deviation in one example.

In one example, a negative cumulative deviation and a positive cumulative deviation are separately determined to be used as may be desired. Another example includes determining a total cumulative deviation for at least a portion of the signatures that is of interest.

An example device for monitoring quality includes a sensor that detects at least one characteristic of a process for determining an actual process signature based on the detected characteristic. A quality indicator determines a cumulative deviation of a plurality of segments of the actual process signature from corresponding segments of an expected signature as an indicator of the quality of the process.

The various features and advantages of this invention will become apparent to those skilled in the art from the following detailed description of a currently preferred embodiment. The drawings that accompany the detailed description can be briefly described as follows.

DETAILED DESCRIPTION OF THE PREFERRED EMBODIMENT

Figure 1:
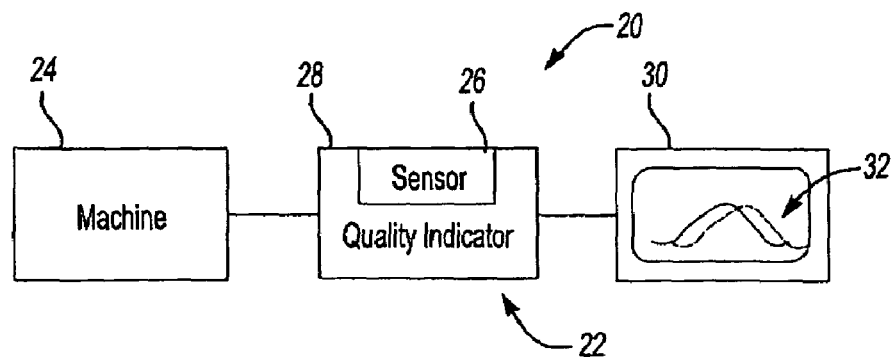
FIG. 1 schematically illustrates an assembly including a device for monitoring a manufacturing process designed according to an embodiment of this invention.

FIG. 1 schematically shows an assembly 20 including a device 22 for monitoring quality. An example machine 24 performs a manufacturing process for manufacturing or forming a part, for example. Example machines include wire crimping machines, tube forming machines, conduit coupling machines and presses. This invention is not limited to a particular kind of machine or manufacturing process.

The device 22 includes a sensor 26 for detecting at least one characteristic of the manufacturing process in a known manner. Example characteristics include a force applied by the machine 24, an amount of current draw during operation of the machine 24 or a distance that a component of the machine 24 moves. The information from the sensor 26 is useful for determining an actual process signature that represents a value of the detected characteristic during the process. The actual process signature may represent the detected characteristic relative to time or position, for example. Given this description, those skilled in the art will be able to select an appropriate characteristic and an appropriate process signature to meet the needs of their particular situation.

The example device 22 includes a quality indicator 28 that uses a cumulative deviation of at least a portion of the actual process signature from at least a corresponding portion of an expected signature as an indicator of quality. The cumulative deviation may indicate a quality of the process, the resulting product or both.

The quality indicator 28 is a microprocessor in one example. Another example comprises custom designed circuitry. Given this description, those skilled in the art will be able to select or design hardware, software, firmware or a combination of them to realize a quality indicator to meet their particular needs.

The example of FIG. 1 includes a display 30 that provides a visual representation 32 of the actual process signature relative to an expected signature.

Figure 2:
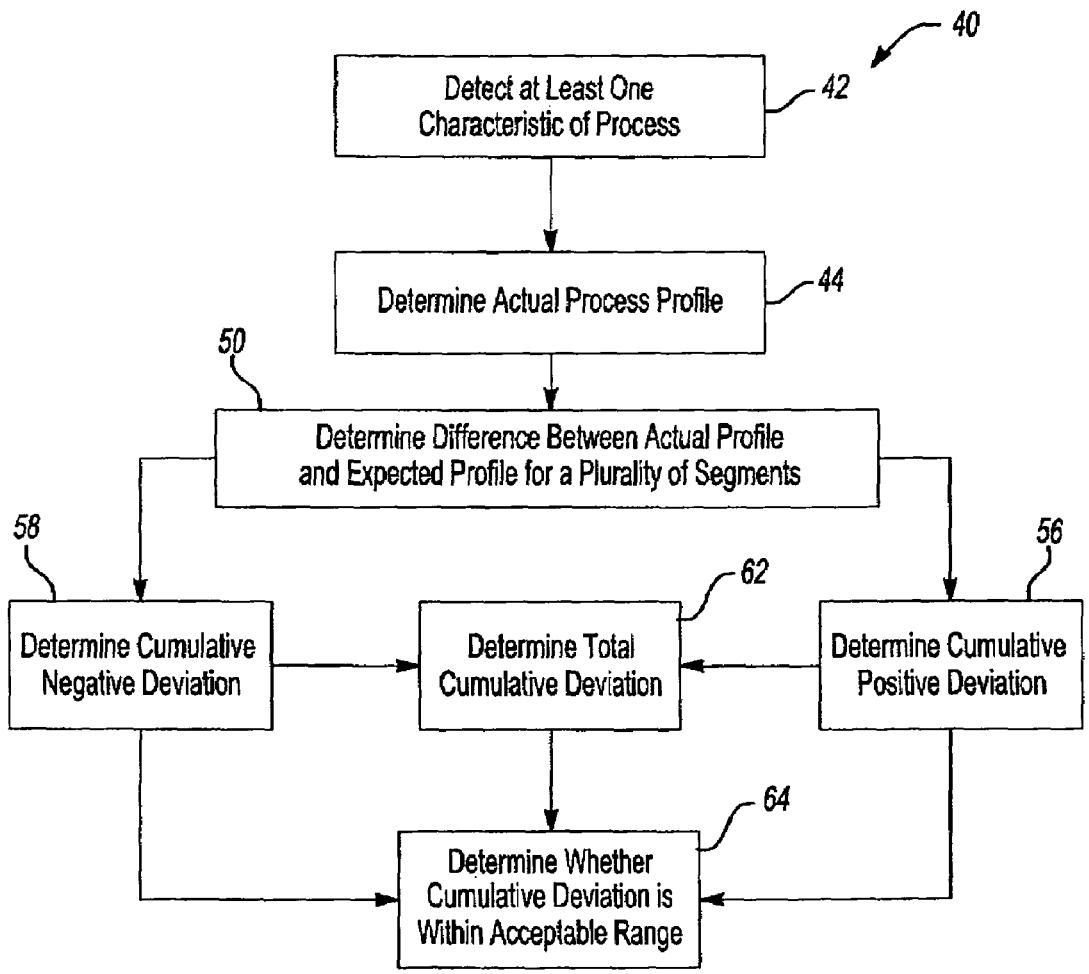
FIG. 2 is a flowchart diagram summarizing one example approach.
Figure 3:
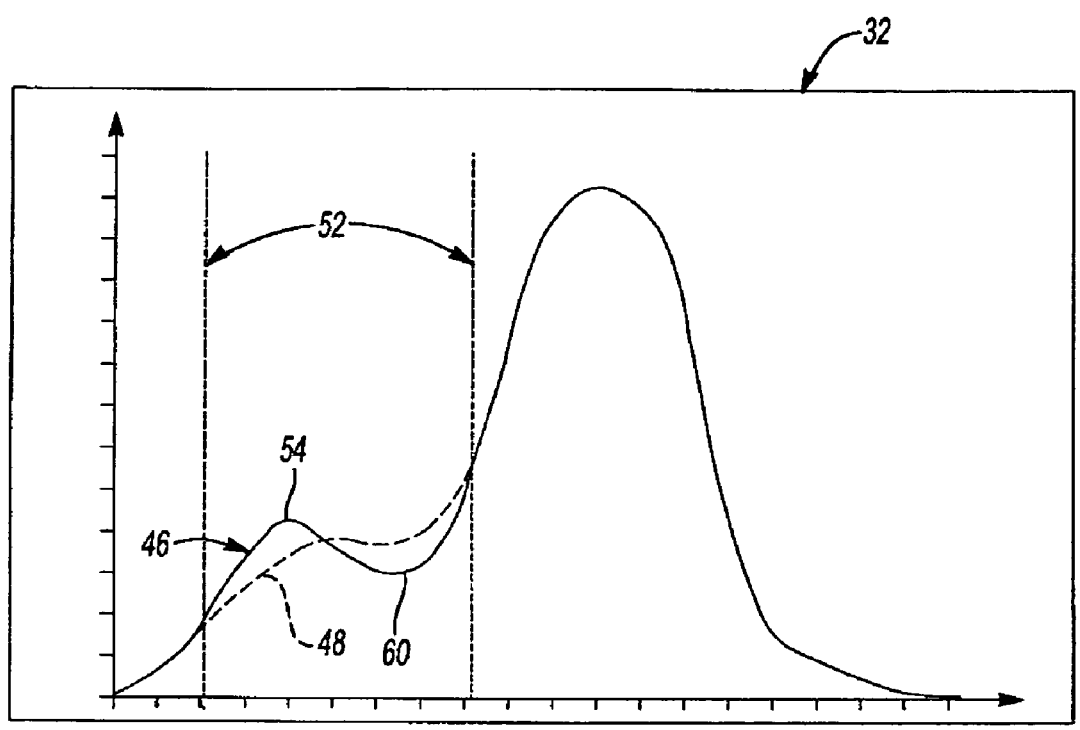
FIG. 3 schematically illustrates a feature of an example technique.

FIG. 2 shows a flowchart diagram 40 summarizing one example approach. The example of FIG. 2 begins at 42 where the sensor 26 detects at least one characteristic of the process of interest. At 44, the actual process signature is determined based upon the detected characteristic. FIG. 3 shows one example actual process signature 46 superimposed over an expected signature 48, corresponding to the same process.

The technique shown in FIG. 2 includes determining a difference between the actual process signature 46 and the expected signature 48 for a plurality of corresponding segments of the signatures. One example includes analyzing the entire signature and taking segments of a selected length for comparing the actual process signature 46 to the expected signature 48. Another example isolates only some of the signatures for analysis.

One example includes determining a quantitative value of any difference between the signatures for each segment. One example includes using segments corresponding to a selected length of time that is significantly less than the entire length of time for the process. Another example includes selecting segments corresponding to a distance that is significantly less than an entire distance or change in position that occurs over the entire process. In other words, a plurality of segments that each are a small portion of the entire signature are used for determining any differences between corresponding segments of the signatures 46 and 48.

In the illustrated example, the actual process signature 46 is essentially consistent with the expected signature 48 except in the region designated 52. The example of FIG. 3 includes a portion of the actual process signature at 54 where the amplitude of the signature exceeds that of the expected signature 48. The flow chart in FIG. 2 includes determining a cumulative positive deviation at 56. This involves determining a cumulative deviation for the portion 54 of the example of FIG. 3.

The illustrated example also includes determining a cumulative negative deviation at 58. Referring again to FIG. 3, a portion 60 of the actual process signature 46 is below the expected signature 48. The determination made at 58 in FIG. 2 includes determining a cumulative deviation for any portion of the actual process signature 46 where the expected signature 48 exceeds the actual process signature 46. In other words, the step at 58 in FIG. 2 includes determining a quantitative value of the cumulative deviation at 60 in FIG. 3.

There are situations where knowing the positive cumulative deviation separately from the negative cumulative deviation has value. Those skilled in the art who have the benefit of this description will realize how to use such information to their benefit for their particular situation.

The example of FIG. 2 includes determining a total cumulative deviation at 62. In one example, this involves taking the absolute value of the negative deviation so that the total cumulative deviation represents an aggregate deviation. In other words, this example does not include subtracting the negative deviations from the positive deviations.

The example of FIG. 2 also includes a step 64 for determining whether the cumulative deviation is within an acceptable range that corresponds to a desired process or part quality. Any one of the determined cumulative deviations (i.e., the negative, positive or total) may be useful for the determination made at 64. Some examples include using more than one of such deviations for making an appropriate quality determination.

One advantage of the disclosed example technique is that it accounts for a wider variety of deviations from an expected signature to catch poor quality processes, parts or both better than previous techniques. Additionally, the cumulative deviation technique described above allows for saving materials and other costs by being able discern when a part or process is acceptable even though there has been deviation from an expected quality analysis signature. The cumulative deviation technique of the disclosed example allows for precise analysis and provides the ability to detect specific and minute defects while at the same time accommodating some level of process variation.

One example includes selecting portions of the signatures that are considered more significant than others. Identifying such portions allows for more sensitive analysis or to focus on the most critical stages of a forming process, for example. In one example, significant portions of the signatures are analyzed independently, using a cumulative deviation technique for each such portion. In that example, each significant portion has its own cumulative deviation value (or values if there is positive and negative deviation within that portion) that can be evaluated or compared to an acceptable range. Such an approach allows for even tighter tolerance control over specific areas of a part or specific portions of a manufacturing process, for example.

Another advantage of the disclosed technique is that it does not require more complex monitoring equipment and does not require workers to have higher levels of skill for operating such a device. The disclosed approach is capable of detecting collections of minor deviations that are indicative of less than acceptable quality that go undetected by even combinations of previously known signature analysis algorithms. Tolerances can be more accurately set using a technique as described above.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of monitoring quality, comprising:
   determining a cumulative deviation of any deviation between a plurality of segments of an actual manufacturing process signature and corresponding segments of an expected signature, wherein the manufacturing process comprises at least one of crimping, forming, coupling pieces together or pressing;
   determining whether the determined cumulative deviation is within a range corresponding to a desired quality; and
   using the determined cumulative deviation as an indicator of quality of at least one of the manufacturing process or a resulting part.

2. The method of claim 1, comprising determining a quantitative value of the cumulative deviation.

3. The method of claim 2, comprising determining a quantitative value of a deviation of the actual process signature from the expected signature at each of the corresponding segments and using the determined quantitative values for determining the cumulative deviation.

4. The method of claim 1, wherein the plurality of segments extend along a selected portion of the signatures.

5. The method of claim 1, wherein the plurality of segments extend along the entire signatures.

6. The method of claim 1, comprising determining the cumulative deviation for a first portion of the actual process signature that includes the actual process signature exceeding a corresponding portion of the expected signature.

7. The method of claim 6, comprising determining the cumulative deviation for a second portion of the actual process signature that includes a corresponding portion of the expected signature exceeding the actual process signature.

8. The method of claim 7, comprising determining a cumulative deviation that includes the determined cumulative deviations of the first and second portions.

9. The method of claim 1, comprising determining the cumulative deviation for a portion of the actual process signature that includes a corresponding portion of the expected signature exceeding the actual process signature.

10. The method of claim 1, comprising determining the actual process signature based upon at least one characteristic of the process.

11. The method of claim 10, wherein the at least one characteristic comprises at least one of
    a force applied during the manufacturing process,
    an amount of current draw during the manufacturing process, or
    a distance that a component moves during the manufacturing process.

12. A device for monitoring quality, comprising:
    a sensor that detects at least one characteristic of a manufacturing process for determining an actual manufacturing process signature based on the detected characteristic, the manufacturing process comprising at least one of crimping, forming, coupling pieces together or pressing; and
    a quality indicator that determines a cumulative deviation of any deviation between a plurality of segments of the actual manufacturing process signature and corresponding segments of an expected signature and determines whether the determined cumulative deviation is within a range corresponding to a desired quality, wherein the determined cumulative deviation is an indicator of quality of at least one of the manufacturing process or a resulting part.

13. The device of claim 12, wherein the quality indicator determines a quantitative value of the cumulative deviation.

14. The device of claim 12, comprising wherein the quality indicator determines a quantitative value of a deviation of the actual process signature from the expected signature at each of the corresponding segments and uses the determined quantitative values for determining the cumulative deviation.

15. The device of claim 12, wherein the quality indicator provides an indication of whether the determined cumulative deviation is within the range corresponding to desired quality.

16. The device of claim 12, wherein the quality indicator uses a plurality of segments that extend along a selected portion of the signatures.

17. The device of claim 12, wherein the quality indicator uses a plurality of segments that extend along the entire signatures.

18. The device of claim 12, wherein the quality indicator determines the cumulative deviation for a first portion of the actual process signature that includes at least one of the actual process signature exceeding a corresponding portion of the expected signature or the expected signature exceeding the actual process signature.

19. The device of claim 18, wherein the quality indicator determines the cumulative deviation for a second portion of the actual process signature that includes the other of the corresponding portion of the expected signature exceeding the actual process signature or the actual process signature exceeding the corresponding portion of the expected signature.

20. The device of claim 19, wherein the quality indicator determines the cumulative deviation using the determined cumulative deviations of the first and second portions.

21. The device of claim 12, wherein the at least one characteristic is a characteristic of an operation of a machine used to complete the manufacturing process.

22. A method of monitoring quality, comprising:
    Determining a cumulative deviation of a plurality of segments of an actual process signature from corresponding segments of an expected signature to determine whether the cumulative deviation is within an acceptable range as an indicator of quality, wherein the plurality of segments extend along at least one of a selected portion of the actual process and expected signatures or the entire actual process and expected signatures.

23. A method of monitoring quality, comprising:
    determining a cumulative deviation of a plurality of segments of an actual process signature from corresponding segments of an expected signature as an indicator of quality; and determining the cumulative deviation for a portion of the actual process signature that includes at least one of a corresponding portion of the expected signature exceeding the actual process signature, or a corresponding portion of the actual process signature exceeding the expected signature.

24. A device for monitoring quality, comprising:

a sensor that detects at least one characteristic of a process for determining an actual process signature based on the detected characteristic; and a quality indicator, that determines a cumulative deviation of a plurality of segments of the actual process signature from corresponding segments of an expected signature and determines whether the cumulative deviation is within an acceptable range as an indicator of quality, the plurality of segments extend along at least one of a selected portion of the actual process and expected signatures or the entire actual process and expected signatures.

25. A device for monitoring quality, comprising:

a sensor that detects at least one characteristic of a process for determining an actual process signature based on the detected characteristic; and a quality indicator that determines a cumulative deviation of a plurality of segments of the actual process signature from corresponding segments of an expected signature as an indicator of quality, the quality indicator determines the cumulative deviation for a first portion of the actual process signature that includes at least one of the actual process signature exceeding a corresponding portion of the expected signature or the expected signature exceeding the actual process signature.

26. The device of claim 25, wherein the quality indicator determines the cumulative deviation for a second portion of the actual process signature that includes the other of the corresponding portion of the expected signature exceeding the actual process signature or the actual process signature exceeding the corresponding portion of the expected signature.

27. The device of claim 26, wherein the quality indicator determines the cumulative deviation using the determined cumulative deviations of the first and second portions.

* * * * *